E. THOMSON.
METHOD OF ELECTRIC SEAM WELDING.
APPLICATION FILED MAY 10, 1913.

1,123,624.

Patented Jan. 5, 1915.

WITNESSES
F. B. Townsend
A. M. McMahon.

INVENTOR
Elihu Thomson.
BY
Townsend & Decker
ATTORNEYS.

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

METHOD OF ELECTRIC SEAM-WELDING.

1,123,624. Specification of Letters Patent. Patented Jan. 5, 1915.

Application filed May 10, 1913. Serial No. 766,733.

*To all whom it may concern:*

Be it known that I, ELIHU THOMSON, a citizen of the United States, and a resident of Swampscott, in the county of Essex and State of Massachusetts, have invented certain new and useful Improvements in Methods of Electric Seam-Welding, of which the following is a specification.

My invention relates to improvements in methods of forming an electrically welded seam in sheet metal by a line of electrically welded spots.

In the formation of a seam by a series of electrically welded spots electrically welded by means of pointed electrodes there is a tendency to buckling or dragging of the material if the attempt be made to form the line of welded spots one at a time. This is particularly the case when the welding is done by the process of rolling sheet metal sheets between rollers, one or both of which are furnished with welding electrodes spaced apart.

The object of my invention is to avoid this tendency to the buckling or dragging of the material particularly when forming circular or cylindrical seams leading around an object, as for instance in the welding of a head of sheet metal into the end of a sheet metal cylinder.

My invention comprises or consists in an improvement on the aforesaid method or process, the essential feature of which improvement is the firm clamping of the work along the line of the seam and throughout substantially its whole extent at the spots of welding simultaneously and then welding at said spots either simultaneously or at one spot at a time.

In the practice of my invention it is possible to weld a portion only of the spots involved in the welded seam and then to form spot welds in the intermediate spaces, since the first series of spots welded will then serve to hold the metal against buckling or dragging through the welding of the second series, but whether the spots be formed all at once or in successive sets or series, it will be obvious the effect of bringing electrodes to bear at spots along the whole line of the seam to be welded and so as to clamp the sheet metal along said seam and then performing the welding operation in said spots, either in the spots simultaneously or one at a time, if desired, (the pressure being maintained, however, at all of the spots,) will be to prevent the buckling or dragging which would ensue if pressure of the welding electrode or electrodes was applied and the welding done at the spots one at a time.

Figure 1:
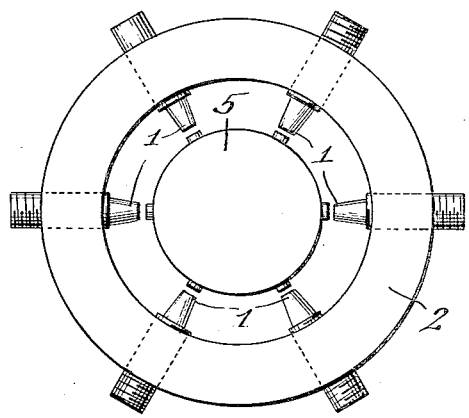
Figure 2:
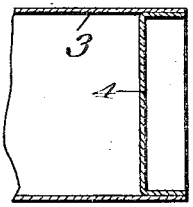
Figure 3:
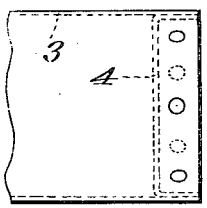

Figure 1 in the accompanying drawings is a plan in skeleton of an apparatus that may be used in practising my invention when it is desired to make a cylindrical seam leading around an object, as for instance, around the end of a cylinder of sheet metal having a head inserted therein as shown in Fig. 2. Fig. 3 illustrates the relative location of the spots when a portion only of the spots forming the complete welded seam are made at one time.

1 indicates a series of welding electrodes arranged in a suitable frame or support 2 and capable of being forced inward to grasp the edge of the cylinder 3, shown in Fig. 2, and the edge of the inserted cover or end 4 between the electrodes 1 and coöperating welding electrodes on or formed on a central mandrel or electrode 5.

The electrodes 1 may be operated simultaneously or one at a time but they are all employed in such manner as to act at the same time to securely hold the sheet metal work along the whole extent of the spot welded seam. The work being thus held securely, the electric welding is effected in the usual manner by the passage of the current through the electrodes and the work held between them, thus forming a number of spots of welded union. Any desired number of electrodes may be employed or their number may be limited and the operation repeated to multiply the whole number of spots in the completed seam; thus for instance, after forming a number of spots of welded union along the seam, the work may be turned and clamped at intermediate points by means of said electrodes and the welding operation repeated.

In Fig. 3 the first set of welded spots is shown in full lines and the second set by the dotted lines.

What I claim as my invention is:—

1. The improvement in forming a spot welded seam in sheet metal by the use of pointed electrodes, consisting in applying the electrode pressure to the work at a series of spots along the seam all at once and so as to firmly clamp the work at all of said spots at the same time and then performing the electric welding operation at said spots of clamping.

2. The improvement in forming a spot welded seam in sheet metal by the electric spot welding process, consisting in rigidly clamping the sheet metal at a series of spots disposed along the whole extent of the seam to be formed and so as to rigidly hold the work along the whole extent of the seam by pressure applied at said spots at the same time simultaneously and then making the electric spot welds by the use of electric current passed through the work at said points or spots of clamping.

3. The herein described method of forming a circular seam in sheet metal, consisting in clamping the sheet of metal at a number of spots simultaneously and disposed around the whole circumference of the circle and so as to hold the sheet metal rigidly clamped at all of said spots simultaneously and then making electric spot welds at said spots of clamping as and for the purpose described.

4. The herein described method of forming a circular seam in sheet metal by the spot welding process, consisting in firmly clamping the work at a number of spots in the circumference of said circle simultaneously, then making electric spot welds at said points of clamping and thereafter clamping and forming spot welds at intermediate points along the line of the seam to be made.

Signed at Lynn in the county of Essex and State of Massachusetts this 2nd day of May A. D. 1913.

ELIHU THOMSON.

Witnesses:
JOHN A. McMANUS, Jr.,
HENRY A. ANDERSEN.